(12) United States Patent
Singh et al.

(10) Patent No.: US 11,856,544 B2
(45) Date of Patent: Dec. 26, 2023

(54) DELAY OFFSET FOR REDUCING TIME SYNCHRONIZATION ERROR IN TIME SENSITIVE NETWORKING (TSN) SYSTEMS

(71) Applicant: Telefonaktiebolaget LM Ericsson (publ), Stockholm (SE)

(72) Inventors: Bikramjit Singh, Kirkkonummi (FI); John Walter Diachina, Garner, NC (US); Magnus Sandgren, Staffanstorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 166 days.

(21) Appl. No.: 17/437,914

(22) PCT Filed: Mar. 13, 2020

(86) PCT No.: PCT/EP2020/056970
§ 371 (c)(1),
(2) Date: Sep. 10, 2021

(87) PCT Pub. No.: WO2020/183014
PCT Pub. Date: Sep. 17, 2020

(65) Prior Publication Data
US 2022/0141784 A1   May 5, 2022

Related U.S. Application Data

(60) Provisional application No. 62/818,477, filed on Mar. 14, 2019.

(51) Int. Cl.
*H04W 56/00* (2009.01)
(52) U.S. Cl.
CPC ..... *H04W 56/005* (2013.01); *H04W 56/0015* (2013.01)

(58) Field of Classification Search
None
See application file for complete search history.

(56) References Cited

U.S. PATENT DOCUMENTS

| 2002/0051431 | A1 | 5/2002 | Choi et al. |
| 2012/0120821 | A1 | 5/2012 | Kazmi et al. |
| (Continued) | | | |

FOREIGN PATENT DOCUMENTS

WO   WO-2017171623 A2 * 10/2017 ........... H04B 7/0617

OTHER PUBLICATIONS

International Search Report and Written Opinion dated Jun. 22, 2020 for International Application No. PCT/EP2020/056970 filed Mar. 13, 2020, consisting of 10-pages.
(Continued)

*Primary Examiner* — Saad Khawar
(74) *Attorney, Agent, or Firm* — Christopher & Weisberg, P.A.

(57) ABSTRACT

A method, system and apparatus are disclosed for a network node configured to communicate with a wireless device (WD). In some embodiments, the network node includes processing circuitry configured to cause the network node to determine delay offset information based at least in part on a common distance for a cell, the delay offset information indicating a common temporal delay offset and transmit the delay offset information to the WD in at least one of a system information block, SIB, and a radio resource control, RRC, message. In some embodiments, a wireless device includes processing circuitry configured to cause the wireless device to receive delay offset information in at least one of a system information block, SIB, and a radio resource control, RRC, message, the delay offset information being based at least in part on a common distance and the delay offset information indicating a common temporal delay offset.

14 Claims, 9 Drawing Sheets

(56) References Cited

U.S. PATENT DOCUMENTS

2014/0355574 A1 12/2014 Turtinen et al.
2018/0146445 A1* 5/2018 Lee ..................... H04W 56/00
2019/0090261 A1* 3/2019 Yang .................... H04L 1/0026

OTHER PUBLICATIONS

3GPP TSG RAN WG1 Ad-Hoc Meeting 1901 Tdoc R1-1901353; Title: Analysis of Time Synchronization Accuracy over Uu Interface; Agenda Item: 7.2.6.4; Source: Ericsson; Document for: Discussion, Decision; Date and Location: Jan. 21-25, 2019, Taipei, Taiwan, consisting of 6-pages.

3GPP TSG-RAN WG2 $104 Tdoc R2-1817173; Title: Clock Accuracy Realization at UE; Agenda Item: 11.7.2.1; Source: Ericsson; Document for: Discussion; Date and Location: Nov. 12-16, 2018, Spokane, USA, consisting of 6-pages.

3GPP TSG RAN WG1 Meeting #95 R1-1812228; Title: Discussion on latency and time synchronization accuracy in Rel-16; Agenda Item: 5; Source: Huawei, HiSilicon; Document for: Discussion and decision; Date and Location: Nov. 12-16, 2018, Spokane, USA, consisting of 12-pages.

3GPP TSG RAN WG1 Meeting #95 R1-1813120; Title: Discussion on the RAN2 LS on TSN requirements evaluation; Agenda Item: 5; Source: Nokia, Nokia Shanghai Bell; Document for: Discussion and Decision; Date and Location: Nov. 12-16, 2018, Spokane, US, consisting of 13-pages.

* cited by examiner

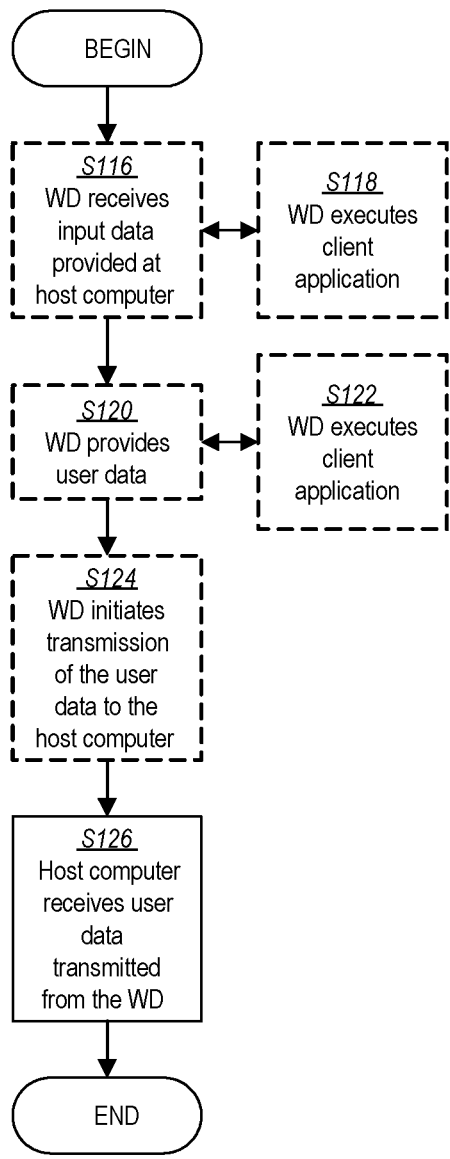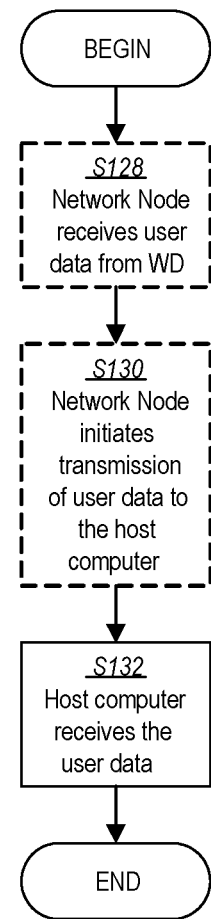
FIG. 5
FIG. 6

DELAY OFFSET FOR REDUCING TIME SYNCHRONIZATION ERROR IN TIME SENSITIVE NETWORKING (TSN) SYSTEMS

CROSS-REFERENCE TO RELATED APPLICATIONS

This application is a Submission Under 35 U.S.C. § 371 for U.S. National Stage Patent Application of International Application No.: PCT/EP2020/056970, filed Mar. 13, 2020 entitled "DELAY OFFSET FOR TIME SYNCHRONIZATION IN COMMUNICATION NETWORKS," which claims priority to U.S. Provisional Application No.: 62/818,477, filed Mar. 14, 2019, entitled "DELAY OFFSET FOR REDUCING TIME SYNCHRONIZATION ERROR IN TIME SENSITIVE NETWORKING (TSN) SYSTEMS," the entireties of both of which are incorporated herein by reference.

TECHNICAL FIELD

The present disclosure relates to wireless communications, and in particular, to synchronizing communications between a network node and a wireless device in a wireless communications network, such as a time-sensitive network.

BACKGROUND

The 3$^{rd}$ Generation Partnership Project (3GPP) New Radio (NR), also referred to as "5G" is intended to support time sensitive networking (TSN), e.g., 5G integrated in Ethernet-based industrial communication networks. Use cases may include factory automation networking and related technologies. In such a system, the problem of clock inaccuracy is inherent to methods for relaying one or more clocks (e.g., external TSN clocks) via the 5G system to wireless devices (WDs) supporting industrial internet of things (IIoT) end devices. The inaccuracy of concern is a result of the radio frequency (RF) propagation delay that occurs when a network node, such as a gNB, transmits a clock over the radio interface within a message (e.g., system information block (SIB) or radio resource control (RRC) unicast based) wherein the propagation delay may need to be compensated to ensure the clock value received by the WD is as close as possible to the value of that clock in the corresponding source node (e.g., a TSN network node).

When delivering a clock to a WD one of the methods possible for mitigating the effect of RF propagation delay is that of utilizing ½ timing advance (TA) to discount synchronization error. However, because TA is designed for another purpose in 3GPP, aligning individual WD uplink transmissions at the base station with an error related to the Cyclic Prefix (15 kilohertz (kHz) subcarrier spacing cyclic prefix (CP) equals 4.7 microseconds (μs)) independent of RF path distance towards the network node, the 3GPP specified TA accuracy is not sufficient for accurate end-to-end timing delivery budget in a TSN network.

SUMMARY

According to one aspect of the present disclosure, a method implemented in a network node supporting a cell is provided. The network node is configured to communicate with a wireless device, WD, for performing clock synchronization. The method includes determining delay offset information based at least in part on a common distance for the cell, the delay offset information indicating a common temporal delay offset. The method includes transmitting the delay offset information to the WD in at least one of a system information block, SIB, and a radio resource control, RRC, message.

In some embodiments of this aspect, determining the delay offset information based at least in part on the common distance for the cell further includes determining the delay offset information based at least in part on a distance, x, that is associated with a radius, R, of the cell supported by the network node, where 0≤x≤R and the radius of the cell is a distance between a center of the cell and a cell edge of the cell. In some embodiments of this aspect, determining the delay offset information based at least in part on the distance, x, that is associated with the radius, R, of the cell further includes determining the delay offset information based at least in part on a distance equal to half of the radius of the cell. In some embodiments of this aspect, determining the delay offset information based at least in part on the distance, x, that is associated with the radius, R, of the cell further includes determining the delay offset information based at least in part on a distance that is a fraction of the radius of the cell, the fraction being selected based at least in part on at least one of a signal-to-noise ratio, SNR, and an estimated distribution of WDs within the cell.

In some embodiments of this aspect, determining the delay offset information based at least in part on the common distance for the cell further includes determining the delay offset information based at least in part on an average distance, x, in the cell supported by the network node, the average distance being an average distance of at least a majority of WDs in the cell from a center of the cell. In some embodiments of this aspect, determining the delay offset information based at least in part on the common distance for the cell further includes determining the delay offset information based solely on the common distance. In some embodiments of this aspect, determining the delay offset information based at least in part on the common distance for the cell further includes determining the delay offset information based further on a non-line-of-sight, NLOS, factor, the NLOS factor based at least in part on a NLOS modeling estimate for WDs in the cell supported by the network node.

In some embodiments of this aspect, the common distance for the cell is a distance that is applied for multiple WDs in the cell supported by the network node for the clock synchronization. In some embodiments of this aspect, the common temporal delay offset compensates for a line-of-sight, LOS, propagation delay error. In some embodiments of this aspect, the method further includes receiving an uplink transmission, the uplink transmission being synchronized to a source clock using the common temporal delay offset that is based at least in part on the common distance for the cell.

According to another aspect of the present disclosure, a method implemented in a wireless device, WD, for performing clock synchronization is provided. The wireless device is configured to communicate with a network node supporting a cell. The method includes receiving delay offset information in at least one of a system information block, SIB, and a radio resource control, RRC, message, the delay offset information being based at least in part on a common distance for the cell and the delay offset information indicating a common temporal delay offset. The method includes optionally, using the common temporal delay offset to adjust a value of a received clock.

In some embodiments of this aspect, the delay offset information is based at least in part on a distance, x, that is associated with a radius, R, of the cell supported by the network node, where $0 \leq x \leq R$ and the radius of the cell is a distance between a center of the cell and a cell edge of the cell. In some embodiments of this aspect, the delay offset information is based at least in part on a distance equal to half of the radius of the cell. In some embodiments of this aspect, the delay offset information is based at least in part on a distance that is a fraction of the radius of the cell, the fraction being based at least in part on at least one of a signal-to-noise ratio, SNR, and an estimated distribution of WDs within the cell. In some embodiments of this aspect, the delay offset information is based at least in part on an average distance, x, in the cell supported by the network node, the average distance being an average distance of at least a majority of WDs in the cell from a center of the cell.

In some embodiments of this aspect, the delay offset information is based solely on the common distance for the cell. In some embodiments of this aspect, the delay offset information is based further on a non-line-of-sight, NLOS, factor, the NLOS factor based at least in part on a NLOS modeling estimate for WDs in the cell supported by the network node. In some embodiments of this aspect, the common distance for the cell is a distance that is applied for multiple WDs in the cell supported by the network node for the clock synchronization. In some embodiments of this aspect, the common temporal delay offset compensates for a line-of-sight, LOS, propagation delay error. In some embodiments of this aspect, the method includes transmitting an uplink transmission, the uplink transmission being synchronized to a source clock using the common temporal delay offset that is based at least in part on the common distance for the cell.

According to yet another aspect of the present disclosure, a network node supporting a cell is provided. The network node is configured to communicate with a wireless device, WD, for performing clock synchronization. The network node includes processing circuitry. The processing circuitry is configured to cause the network node to determine delay offset information based at least in part on a common distance for the cell, the delay offset information indicating a common temporal delay offset; and transmit the delay offset information to the WD in at least one of a system information block, SIB, and a radio resource control, RRC, message.

In some embodiments of this aspect, the processing circuitry is configured to determine the delay offset information based at least in part on the common distance for the cell by being configured to: determine the delay offset information based at least in part on a distance, x, that is associated with a radius, R, of the cell supported by the network node, where $0 \leq x \leq R$ and the radius of the cell is a distance between a center of the cell and a cell edge of the cell. In some embodiments of this aspect, the processing circuitry is configured to determine the delay offset information based at least in part on the distance, x, that is associated with the radius, R, of the cell by being configured to: determine the delay offset information based at least in part on a distance equal to half of the radius of the cell.

In some embodiments of this aspect, the processing circuitry is configured to determine the delay offset information based at least in part on the distance, x, that is associated with the radius, R, of the cell by being configured to: determine the delay offset information based at least in part on a distance that is a fraction of the radius of the cell, the fraction being selected based at least in part on at least one of a signal-to-noise ratio, SNR, and an estimated distribution of WDs within the cell. In some embodiments of this aspect, the processing circuitry is configured to determine the delay offset information based at least in part on the common distance for the cell by being configured to: determine the delay offset information based at least in part on an average distance, x, in the cell supported by the network node, the average distance being an average distance of at least a majority of WDs in the cell from a center of the cell.

In some embodiments of this aspect, the processing circuitry is configured to determine the delay offset information based at least in part on the common distance for the cell by being configured to: determine the delay offset information based solely on the common distance. In some embodiments of this aspect, the processing circuitry is configured to determine the delay offset information based at least in part on the common distance for the cell by being configured to determine the delay offset information based further on a non-line-of-sight, NLOS, factor, the NLOS factor based at least in part on a NLOS modeling estimate for WDs in the cell supported by the network node. In some embodiments of this aspect, the common distance for the cell is a distance that is applied for multiple WDs in the cell supported by the network node for the clock synchronization.

In some embodiments of this aspect, the common temporal delay offset compensates for a line-of-sight, LOS, propagation delay error. In some embodiments of this aspect, the processing circuitry is further configured to cause the network node to receive an uplink transmission, the uplink transmission being synchronized to a source clock using the common temporal delay offset that is based at least in part on the common distance for the cell.

According to yet another aspect of the present disclosure, a wireless device, WD, configured to perform clock synchronization and configured to communicate with a network node supporting a cell is provided. The wireless device includes processing circuitry. The processing circuitry is configured to cause the wireless device to: receive delay offset information in at least one of a system information block, SIB, and a radio resource control, RRC, message, the delay offset information being based at least in part on a common distance for the cell and the delay offset information indicating a common temporal delay offset; and optionally, use the common temporal delay offset to adjust a value of a received clock.

In some embodiments of this aspect, the delay offset information is based at least in part on a distance, x, that is associated with a radius, R, of the cell supported by the network node, where $0 \leq x \leq R$ and the radius of the cell is a distance between a center of the cell and a cell edge of the cell. In some embodiments of this aspect, the delay offset information is based at least in part on a distance equal to half of the radius of the cell. In some embodiments of this aspect, the delay offset information is based at least in part on a distance that is a fraction of the radius of the cell, the fraction being based at least in part on at least one of a signal-to-noise ratio, SNR, and an estimated distribution of WDs within the cell.

In some embodiments of this aspect, the delay offset information is based at least in part on an average distance, x, in the cell supported by the network node, the average distance being an average distance of at least a majority of WDs in the cell from a center of the cell. In some embodiments of this aspect, the delay offset information is based solely on the common distance for the cell. In some embodiments of this aspect, the delay offset information is based further on a non-line-of-sight, NLOS, factor, the NLOS factor based at least in part on a NLOS modeling estimate for WDs in the cell supported by the network node.

In some embodiments of this aspect, the common distance for the cell is a distance that is applied for multiple WDs in the cell supported by the network node for the clock synchronization. In some embodiments of this aspect, the common temporal delay offset compensates for a line-of-sight, LOS, propagation delay error. In some embodiments of this aspect, the processing circuitry is further configured to cause the wireless device to transmit an uplink transmission, the uplink transmission being synchronized to the source clock using the common temporal delay offset that is based at least in part on the common distance for the cell.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
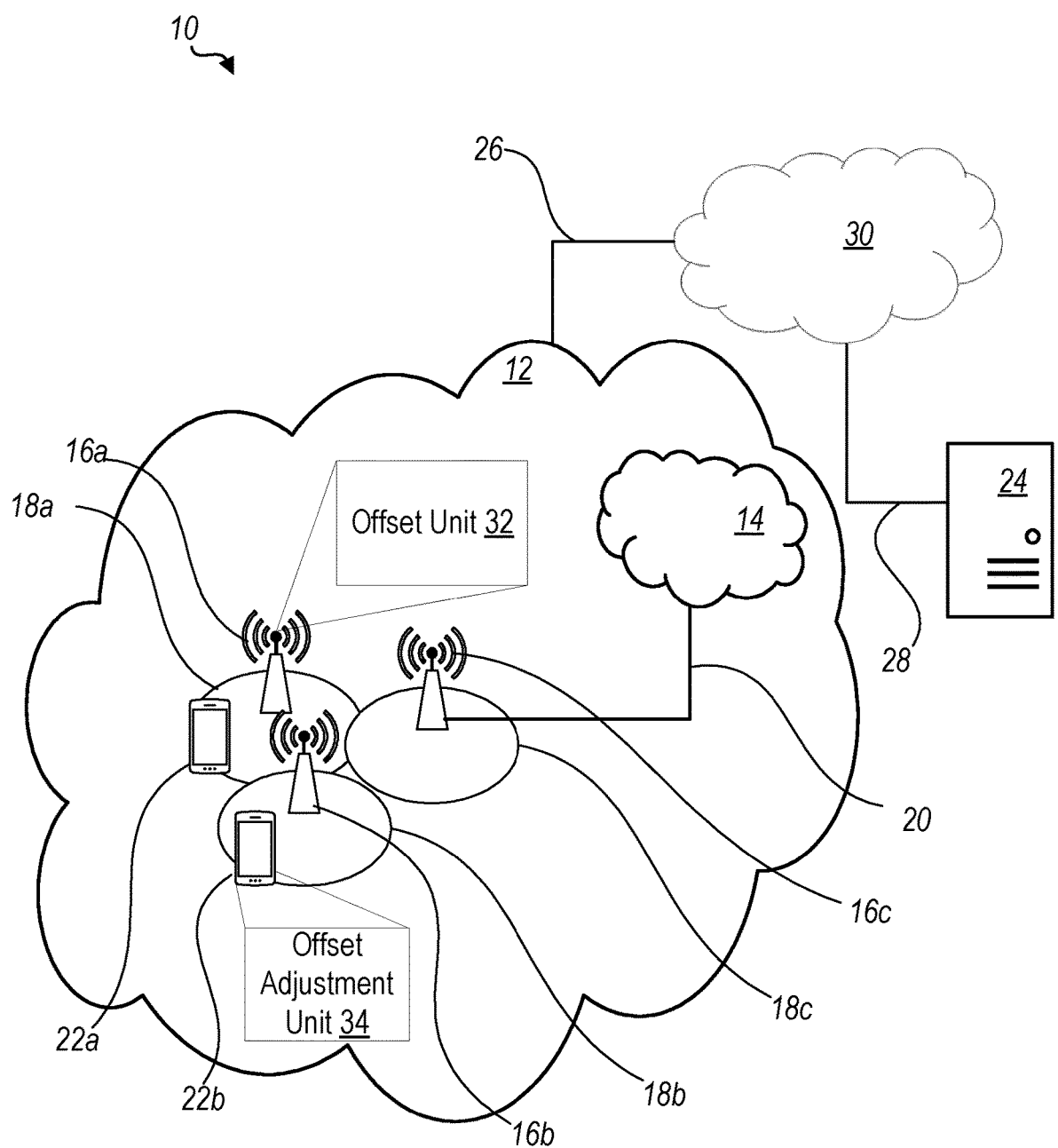
FIG. 1 is a schematic diagram of an exemplary network architecture illustrating a communication system connected via an intermediate network to a host computer according to the principles in the present disclosure.

Some embodiments advantageously provide methods, systems and apparatuses for reducing propagation delay (PD) error, e.g., maximum PD error or average PD error by introducing a common delay offset, e.g., based on a common distance (as discussed in more detail in the embodiments described below) in the transmissions for all or multiple WDs in a cell unlike TA (which is WD location dependent for each individual WD). Further, an NLOS factor depending on a channel model (see, for example embodiment 3, described below) can be introduced as the transmissions may not be always be line of sight (LOS) and this may affect the clock synchronization.

Some embodiments described herein can take advantage of the possibility that WDs can have a geographical distribution more concentrated within the cell, i.e., the common delay offset could be used to best represent the majority of WDs. Since the complete TSN end-to-end budget may contain multiple individual and, many times, uncorrelated error components, reducing the max PD error by applying a common offset best suited for at least the majority of WDs may reduce the amount of WDs with large total timing errors. Delay offset information, e.g., common delay offset and/or non-line-of-sight (NLOS) factor can be supplied by the network nodes, e.g., gNBs, to WDs using SIB and/or RRC messaging. WDs or NR Industrial Internet-of-Things (IIoT) end stations attached to a WD may make use of this information in their uplink (UL) transmissions (e.g., WD applications that trigger uplink transmissions according to a source clock received from the network node may maximize their synchronicity with that source clock), and thereby improve their synchronicity with the source clock by increasing its value according to the common delay offset and/or NLOS factor.

Alternative approaches for mitigating synchronization errors between the transmitting network node, e.g., gNB, and wireless device, e.g., user equipment (UE) as the receiving node have been implemented without using ½ TA as a source of timing error due to its inherent inaccuracies. However, those approaches involve no method for compensation for LOS error and some embodiments of this disclosure relate to a possible method for realizing such compensation.

The delay error is calculated as d/c where d is the distance from the cell center (network node location) and c is the speed of light. For a cell edge distance of 10 meters (m), the maximum delay error is $10/3 \times 10^8 = \sim 30$ nanoseconds (ns) (33.33 ns to be exact). This may imply that, with no RF propagation delay compensation applied for any of the WDs in the cell, the reference (for the clock synchronization) is only accurate when it reflects WDs at zero RF distance from the network node (network node location). Then, the maximum error due to PD is at the cell edge (30 ns at a distance d=R=10 m), and the minimum delay error is zero at a distance d=0 m, i.e., at the network node. Also considering the total end-to-end timing budget, having the largest propagation error for WDs at the cell edge and smallest for WDs close to the network node is impractical since the WD time stamp accuracy (i.e., its ability to detect when a given reference point within the system frame number (SFN) structure is received) depends on signal-to-noise ratio (SNR) which generally is worse at increasing distance from the network node. The time synchronization accuracy can be improved over known techniques by utilizing a compensation technique such as those described herein.

One or more embodiments of the disclosure solve at least a portion of at least one problem with existing systems/methods by determining a delay offset based on at least one of a common distance and a NLOS factor and/or supplying the delay offset information to WDs using a broadcast signal, such as SIB, or RRC messaging. Before describing in detail exemplary embodiments, it is noted that the embodiments reside primarily in combinations of apparatus components and processing steps related to reducing PD error, e.g., maximum PD error or average PD error, by introducing a common delay offset, e.g., based on a common distance (see, e.g., Embodiments 1 and 2, described below) in the transmissions for all and/or multiple and/or a subset of UEs and WDs in a cell unlike TA (which is WD location dependent).

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, industrial IoT (IIOT) device or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, integrated access and backhaul (IAB) node, access point, radio access point, Remote Radio Unit (RRU) Remote Radio Head (RRH).

In some embodiments, the term "common distance" may be intended to indicate a distance that is applied for all and/or multiple of the WDs in a cell supported by the network node and is a distance that may be used to determine a common temporal delay offset value for the cell and which may be considered common for all and/or multiple of the WDs in the cell (e.g., common temporal delay offset or common distance on which the common temporal delay offset may be based and which may be broadcast to the WDs in the cell). It should be understood that the "common distance" does not require (but also does not exclude a possibility for) all WDs in the cell being located at a same physical distance, but rather that the common distance can be commonly used for and/or by all or multiple of the WDs in the cell for the clock synchronization, i.e., a common delay compensation for a group of WDs belonging to the cell. Accordingly, some embodiments may provide techniques for more efficient signaling (as compared to existing techniques) related to clock synchronization that may, for example, not use individual delay offsets for each WD in the cell as with use of e.g., timing advance (TA). As will be explained in more detail with reference to embodiments below, the common distance may be equal to the average/mean distance of WDs in the cell, one-half cell radius, other fraction of the cell radius, or other distance that is used for all and/or multiple of the WDs in the cell and is relative to a property of the cell such as the cell radius, cell center, cell edge, distribution of WDs in the cell, etc.

In some embodiments, the term "delay offset" and/or "temporal delay offset" is used interchangeably herein. In some embodiments, the term "delay offset" implies a temporal value. In some embodiments, "delay offset information" indicates and/or includes and/or is based on a common distance, x, for the cell from which a temporal delay offset value can be determined and/or calculated for the cell.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments of the present disclosure provide for reduced PD error, e.g., maximum PD error or average PD error, by introducing a common delay offset, e.g., based on a common distance (see the embodiments discussed in more detail below, e.g., embodiments 1 and 2) in the transmissions for all and/or multiple WDs in the cell, unlike TA (which is WD location dependent for each individual WD). Further, an NLOS factor depending on channel model (see e.g., embodiment 3) can be introduced as the transmissions may not be always LOS and this may affect the clock synchronization.

Some embodiments of the present disclosure can take advantage of the possibility that WDs may have a geographical distribution that is more concentrated within the cell, i.e., the common delay offset could best represent at least the majority of WDs. Since the complete TSN end-to-end budget contains multiple individual and many times uncorrelated error components, reducing the max PD error by applying a common offset best suited for at least the majority of WDs would reduce the amount of WDs with large total timing errors. The information, e.g., common delay offset and/or NLOS factor, can be supplied by the network node to WDs using SIB or RRC messaging. WDs or NR IIoT end stations attached to a WD may make use of this information in their UL transmissions (e.g., WD applications that trigger uplink transmissions according to a source clock received from the network node may maximize their synchronicity with that source clock), and thereby improve their synchronicity with the source clock by increasing its value according to the common delay offset and/or NLOS factor.

Using a common delay offset information, WDs may be able to reduce their maximum PD error. For example, if the delay offset is based on a distance R/2, the maximum PD error in for the cell with radius R=10 m reduces to half, i.e., 15 ns.

Alternative methods with individual round trip time (RTT) measurements that could be more accurate than existing TA could be used, however the realization of such methods involve an additional complexity and system overhead. The accuracy and resolution may still not be enough for smaller cells (such as if the error is larger than propagation time within the cell).

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16. In some embodiments, the terms "wireless device (WD)" and "user equipment (UE)" may be used interchangeably and may be used to indicate the wireless device with which the node is communicating.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 supporting a cell can be configured to include an offset unit 32 which is configured to cause the network node 16 to determine delay offset information based at least in part on a common distance for the cell, the delay offset information indicating a common temporal delay offset; and transmit the delay offset information to the WD 22 in at least one of a system information block, SIB, and a radio resource control, RRC, message. In some embodiments, a network node 16 is configured to include an offset unit 32 which is configured to determine a delay offset based on at least one of a common distance and a NLOS factor and supply delay offset information to a WD using SIB or RRC messaging.

A wireless device 22 configured to communicate with a network node 16 supporting a cell can be configured to include an offset adjustment unit 34 which is configured to cause the wireless device 22 to receive delay offset information in at least one of a system information block, SIB, and a radio resource control, RRC, message, the delay offset information being based at least in part on a common distance for the cell and the delay offset information indicating a common temporal delay offset; and optionally, use the common temporal delay offset to adjust a value of a received clock. In some embodiments, a wireless device 22 is configured to include an offset adjustment unit 34 which is configured to receive delay offset information based on at least one of a common distance and a NLOS factor using SIB or RRC messaging and, using the delay offset indicated by the SIB or RRC unicast message, adjust the value of its received clock to thereby realize an improved synchronicity with respect to that clock.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include a monitoring unit 54 configured to enable the service provider to monitor the network node 16 and or the wireless device 22. The processing circuitry 42 of the host computer 24 may also include a control unit 56 configured to enable the service provider to control the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to execute instructions such as software 74 to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16 (e.g. the method described below with reference to FIG. 7, and FIGS. 9 to 11). For example, processing circuitry 68 of the network node 16 supporting a cell may include offset unit 32 configured to cause the network node 16 to determine delay offset information based at least in part on a common distance for the cell, the delay offset information indicating a common temporal delay offset; and transmit the delay offset information to the WD 22 in at least one of a system information block, SIB, and a radio resource control, RRC, message. In some embodiments, processing circuitry 68 of the network node 16 may include offset unit 32 configured to determine a delay offset based on at least one of a common distance and a NLOS factor and supply delay offset information to a WD using SIB or RRC messaging. For example, in one or more embodiments, the offset unit 32 is configured to determine a median radius as described herein. In one or more embodiments, the offset unit 32 is configured to determine a NLOS offset as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22, for example the method the described with respect to FIG. 8. For example, the processing circuitry 84 of the wireless device 22 configured to communicate with a network node 16 supporting a cell may include an offset adjustment unit 34 configured to cause the wireless device 22 to receive delay offset information in at least one of a system information block, SIB, and a radio resource control, RRC, message, the delay offset information being based at least in part on a common distance for the cell and the delay offset information indicating a common temporal delay offset; and optionally, use the common temporal delay offset to adjust a value of a received clock. In some embodiments, the processing circuitry 84 of the wireless device 22 may include an offset adjustment unit 34 configured to receive delay offset information based on at least one of a common distance and a NLOS factor using SIB or RRC messaging and, using the delay offset indicated by the SIB or RRC unicast message, adjust the value of its received clock to thereby realize an improved synchronicity with respect to that clock. The processing circuitry 84 may also include a synchronization unit 94 configured to, when the WD receives the message, allow the WD 22 to synchronize its clock by adding a time offset value of 5R/3 ns. In some embodiments, the synchronization unit 94 is configured to synchronize an uplink transmission to a source clock using the common temporal delay offset that is based at least in part on the common distance for the cell.

Figure 2:
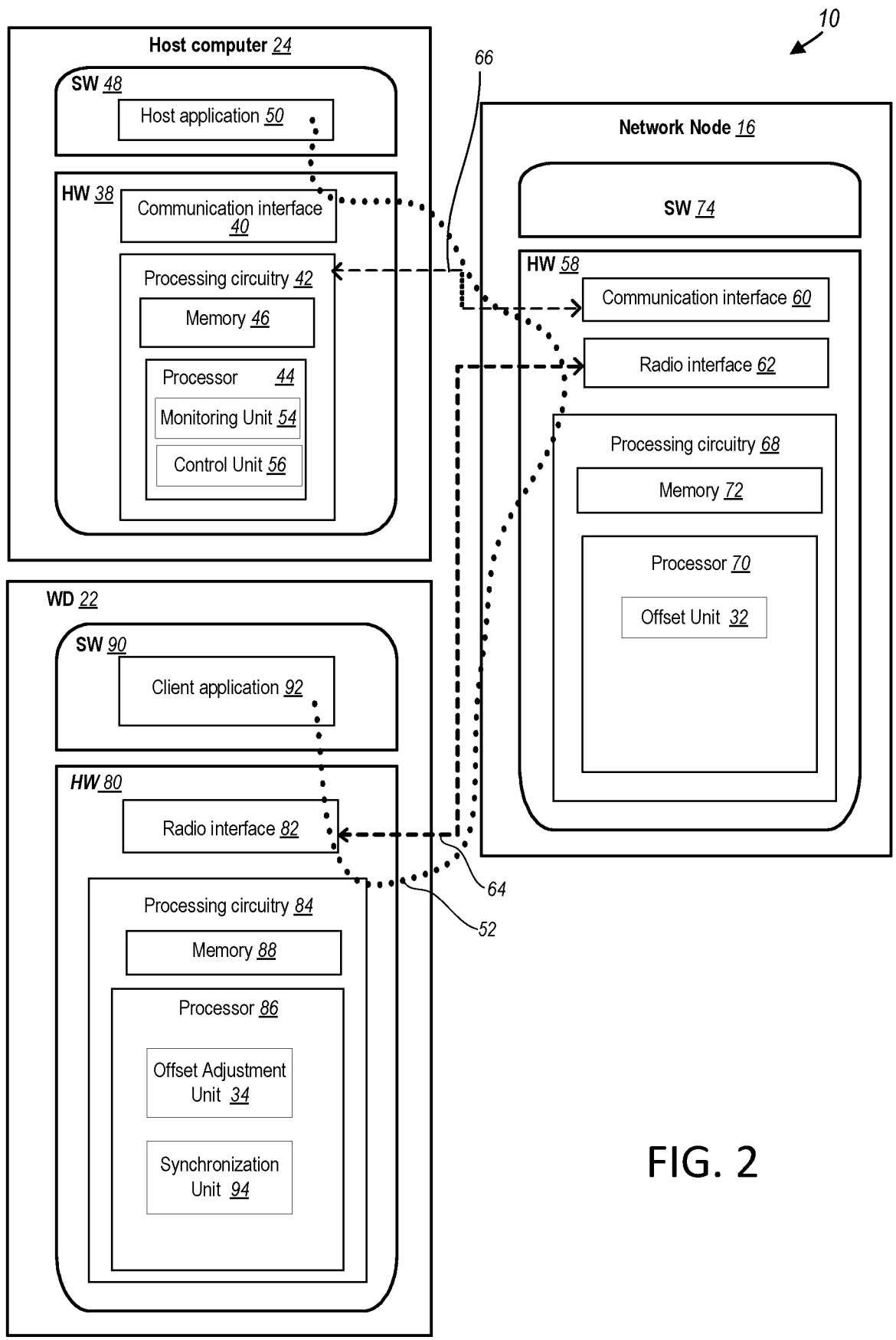
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as offset unit 32, and offset adjustment unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
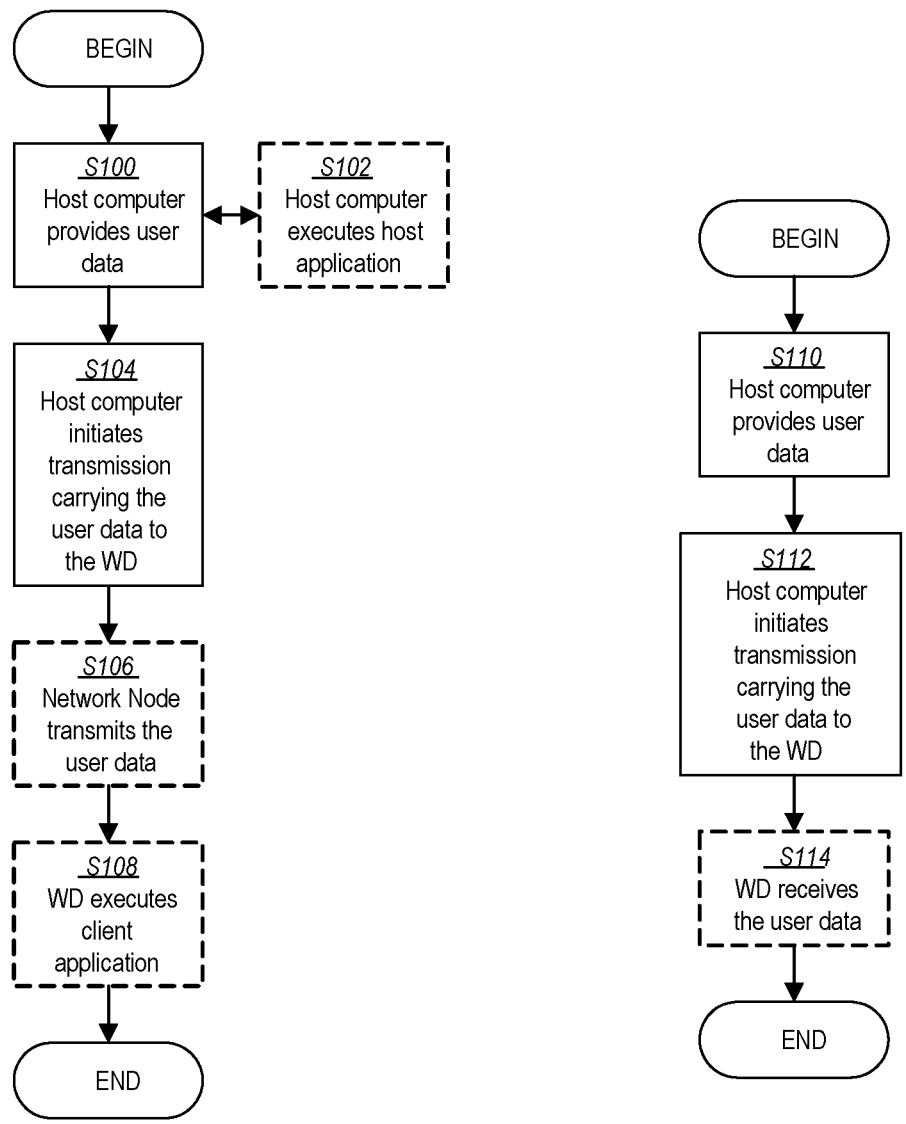
FIG. 3 is a flowchart illustrating exemplary methods implemented in a communication system including a host computer, a network node and a wireless device for executing a client application at a wireless device according to some embodiments of the present disclosure.
FIG. 4 is a flowchart illustrating exemplary methods implemented in a communication system including a host computer, a network node and a wireless device for receiving user data at a wireless device according to some embodiments of the present disclosure.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
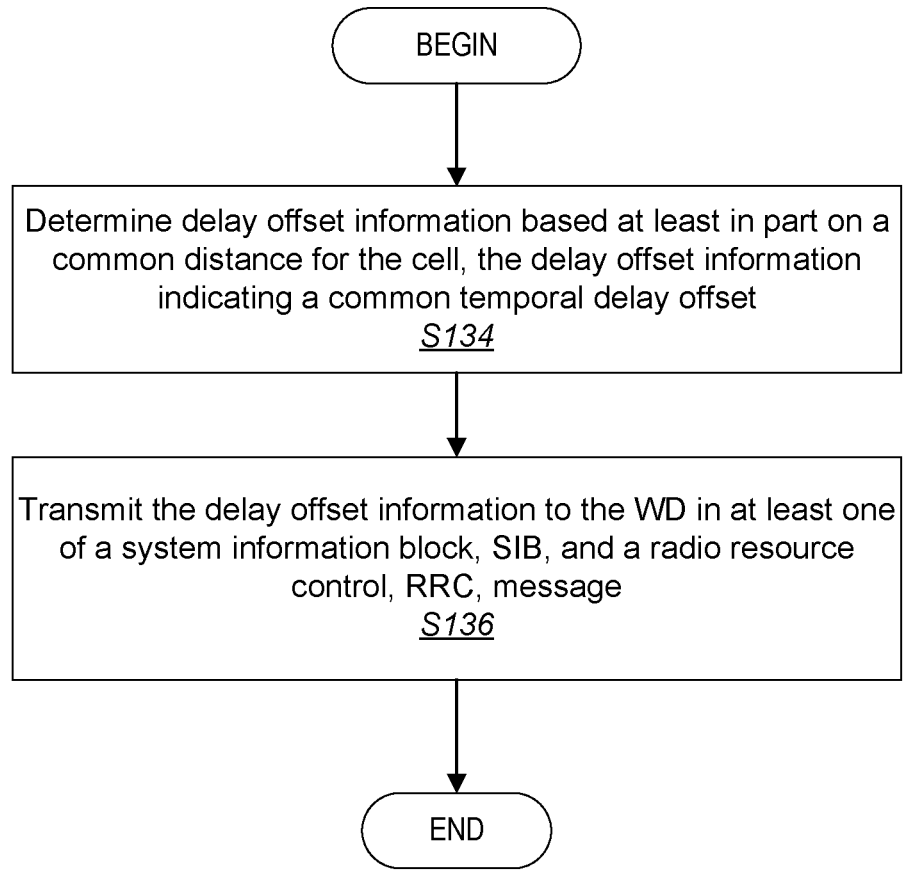
FIG. 7 is a flowchart of an exemplary process in a network node for determining and optionally supplying delay offset information.

FIG. 7 is a flowchart of an exemplary process in a network node 16. One or more Blocks and/or functions performed by network node 16 may be performed by one or more elements of network node 16 such as by offset unit 32 in processing circuitry 68, processor 70, communication interface 60, radio interface 62, etc. In one or more embodiments, network node 16 supporting a cell, such as via one or more of processing circuitry 68, processor 70, radio interface 62 and communication interface 60 is configured to determine (Block S134) delay offset information based at least in part on a common distance for the cell, the delay offset information indicating a common temporal delay offset. Network node 16 such as via one or more of processing circuitry 68, processor 70, radio interface 62 and communication interface 60 is configured to transmit (Block S136) the delay offset information to the WD 22 in at least one of a system information block, SIB, and a radio resource control, RRC, message.

In some embodiments, network node 16 such as via one or more of processing circuitry 68, processor 70, radio interface 62 and communication interface 60 is configured to determine the delay offset information based at least in part on the common distance by being configured to determine the delay offset information based at least in part on a distance, x, that is associated with a radius, R, of the cell supported by the network node 16, where 0≤x≤R and the radius of the cell is a distance between a center of the cell and a cell edge of the cell.

In some embodiments, network node 16 such as via one or more of processing circuitry 68, processor 70, radio interface 62 and communication interface 60 is configured to determine the delay offset information based at least in part on the distance, x, that is associated with the radius, R, of the cell by being configured to determine the delay offset information based at least in part on a distance equal to half of the radius of the cell. In some embodiments, network node 16 such as via one or more of processing circuitry 68, processor 70, radio interface 62 and communication interface 60 is configured to determine the delay offset information based at least in part on the distance, x, that is associated with the radius, R, of the cell by being configured to determine the delay offset information based at least in part on a distance that is a fraction of the radius of the cell, the fraction being selected based at least in part on at least one of a signal-to-noise ratio, SNR, and an estimated distribution of the WDs within the cell.

In some embodiments, network node 16 such as via one or more of processing circuitry 68, processor 70, radio interface 62 and communication interface 60 is configured to determine the delay offset information based at least in part on the common distance for the cell by being configured to determine the delay offset information based at least in part on an average distance, x, in the cell supported by the network node 16, the average distance being an average distance of at least a majority of WDs 22 in the cell from a center of the cell. In some embodiments, network node 16 such as via one or more of processing circuitry 68, processor 70, radio interface 62 and communication interface 60 is configured to determine the delay offset information based at least in part on the common distance for the cell by being configured to determine the delay offset based solely on the common distance.

In some embodiments, network node 16 such as via one or more of processing circuitry 68, processor 70, radio interface 62 and communication interface 60 is configured to determine the delay offset information based at least in part on the common distance by being configured to determine the delay offset information based further on a non-line-of-sight, NLOS, factor, the NLOS factor based at least in part on a NLOS modeling estimate for WDs in the cell supported by the network node 16. In some embodiments, the common distance for the cell is a distance that is applied for multiple WDs 22 in the cell supported by the network node 16 for the clock synchronization. In some embodiments, the common temporal delay offset compensates for a line-of-sight, LOS, propagation delay error. In some embodiments, network node 16 such as via one or more of processing circuitry 68, processor 70, radio interface 62 and communication interface 60 is configured to receive an uplink transmission, the uplink transmission being synchronized to a source clock using the common temporal delay offset that is based at least in part on the common distance for the cell.

In one or more embodiments, network node 16 such as via one or more of processing circuitry 68, processor 70, radio interface 62 and communication interface 60 is configured to supply delay offset information to WDs using SIB or RRC messaging.

In one or more embodiments of the network node, the delay offset is chosen to be at a distance equal to half of the distance between a center of a cell and a cell edge of the cell.

In one or more embodiments, the network node comprises processing circuitry configured to, if a majority of WDs are located at a distance x where 0≤x≤R, choose a reference corresponding to distance x.

In one or more embodiments, the network node comprises processing circuitry configured to estimate potential NLOS modeling estimate fNLOS for the WD and utilize this information for LOS compensation techniques.

In one or more embodiments, the network node comprises processing circuitry configured to, if insufficient information exists with regard to WD distribution within the cell, assume a uniform distribution of WDs in the cell and send SIB information that indicates the distance 0.7×R.

Figure 8:
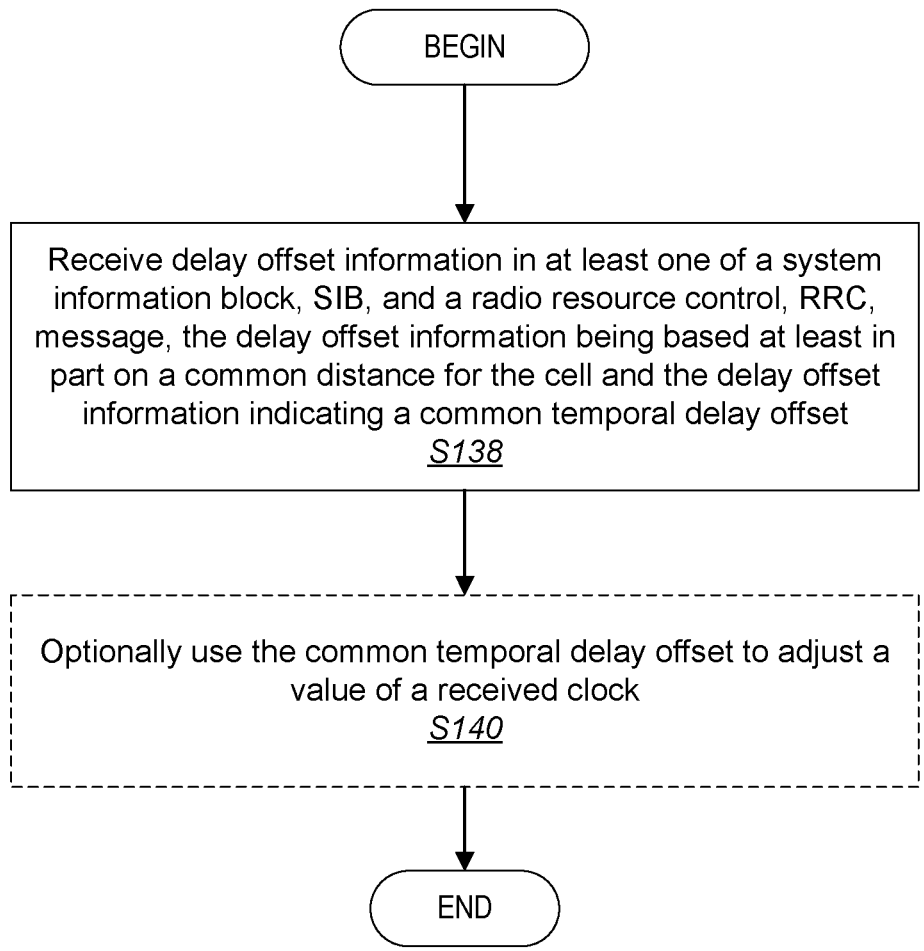
FIG. 8 is a flowchart of an exemplary process in a wireless device for receiving delay offset information.

FIG. 8 is a flowchart of an exemplary process in a wireless device 22 according to some embodiments of the present disclosure. One or more Blocks and/or functions performed by wireless device 22 may be performed by one or more elements of wireless device 22 such as by offset adjustment unit 34 and/or synchronization unit 94 in processing circuitry 84, processor 86, radio interface 82, etc.

In one or more embodiments, wireless device 22 such as via one or more of processing circuitry 84, processor 86 and radio interface 82 is configured to receive (Block S138)

delay offset information in at least one of a system information block, SIB, and a radio resource control, RRC, message, the delay offset information being based at least in part on a common distance for the cell and the delay offset information indicating a common temporal delay offset. In some embodiments, wireless device 22 such as via one or more of processing circuitry 84, processor 86 and radio interface 82 is configured to optionally, use (Block S140) the common temporal delay offset to adjust a value of a received clock.

In some embodiments, the delay offset information is based at least in part on a distance, x, that is associated with a radius, R, of the cell supported by the network node 16, where 0≤x≤R and the radius of the cell is a distance between a center of the cell and a cell edge of the cell. In some embodiments, the delay offset information is based at least in part on a distance equal to half of the radius of the cell. In some embodiments, the delay offset information is based at least in part on a distance that is a fraction of the radius of the cell, the fraction being based at least in part on at least one of a signal-to-noise ratio, SNR, and an estimated distribution of the WDs 22 within the cell.

In some embodiments, the delay offset information is based at least in part on an average distance, x, in the cell supported by the network node 16, the average distance being an average distance of at least a majority of WDs 22 in the cell from a center of the cell. In some embodiments, the delay offset information is based solely on the common distance. In some embodiments, the delay offset information is based further on a non-line-of-sight, NLOS, factor, the NLOS factor based at least in part on a NLOS modeling estimate for WDs 22 in the cell supported by the network node 16.

In some embodiments, the common distance for the cell is a distance that is applied for multiple WDs 22 in the cell supported by the network node 16 for the clock synchronization. In some embodiments, the common temporal delay offset compensates for a line-of-sight, LOS, propagation delay error. In some embodiments, wireless device 22 such as via one or more of processing circuitry 84, processor 86 and radio interface 82 is configured to transmit an uplink transmission, the uplink transmission being synchronized to a source clock using the common temporal delay offset that is based at least in part on the common distance for the cell.

In some embodiments, wireless device 22 such as via one or more of processing circuitry 84, processor 86 and radio interface 82 is configured to receive delay offset information based on at least one of a common distance and a NLOS factor using SIB or RRC messaging.

In one or more embodiments, wireless device 22 such as via one or more of processing circuitry 84, processor 86 and radio interface 82 is configured to use the delay offset indicated by the SIB or RRC message to adjust the value of its received clock to thereby realize an improved synchronicity with respect to an unadjusted version of that clock.

In one or more embodiments of the WD, the delay offset is chosen to be at a distance equal to half of a distance between a center of a cell and a cell edge of the cell.

In one or more embodiments of the WD, the delay offset indicated by the SIB or RRC unicast message is used by the WD to adjust the value of its received clock to thereby realize an improved synchronicity with that clock.

In one or more embodiments of the WD, when the WD receives the message, the WD synchronizes its clock by adding a time offset value of 5R/3 ns.

Figure 9:
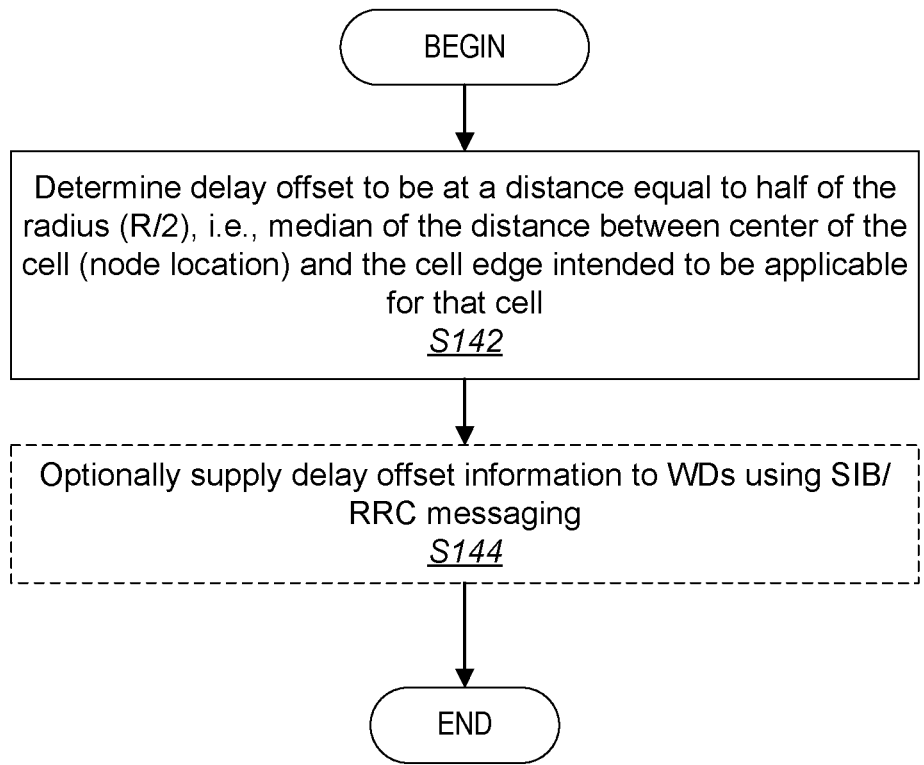
FIG. 9 is a flowchart of an exemplary process in a network node according to some embodiments of the present disclosure for determining a delay offset.

FIG. 9 is a flowchart of an exemplary process in a network node 16. One or more Blocks and/or functions performed by network node 16 may be performed by one or more elements of network node 16 such as by offset unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to determine (Block S142) the delay offset to be at a distance equal to half of the radius (R/2), i.e., the median of the distance between center of the cell (node location) and the cell edge intended to be applicable for that cell.

In one or more embodiments, network node 16 such as via one or more of processing circuitry 68, processor 70, radio interface 62 and communication interface 60 is configured to supply (Block S144) the delay offset information to WDs using SIB or RRC messaging.

Figure 10:
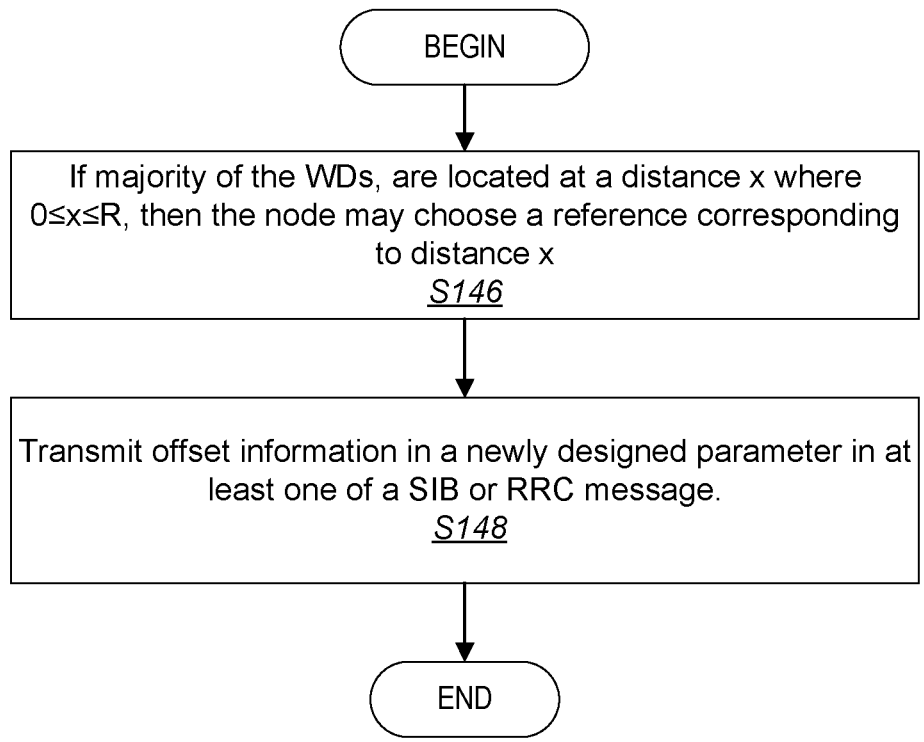
FIG. 10 is a flowchart of an exemplary process in a network node according to some embodiments of the present disclosure for choosing a reference corresponding to distance x.

FIG. 10 is a flowchart of an exemplary process in a network node 16. One or more Blocks and/or functions performed by network node 16 may be performed by one or more elements of network node 16 such as by offset unit 32 in processing circuitry 68, processor 70, communication interface 60, radio interface 62, etc.

In one or more embodiments, network node 16 such as via one or more of processing circuitry 68, processor 70, radio interface 62 and communication interface 60 is configured to, if a majority of the WDs are located at a distance x where 0≤x≤R, choose (Block S146) a reference corresponding to distance x.

In one or more embodiments, network node 16 such as via one or more of processing circuitry 68, processor 70, radio interface 62 and communication interface 60 is configured to transmit (Block S148) offset information in a parameter in a SIB or RRC message.

Figure 11:
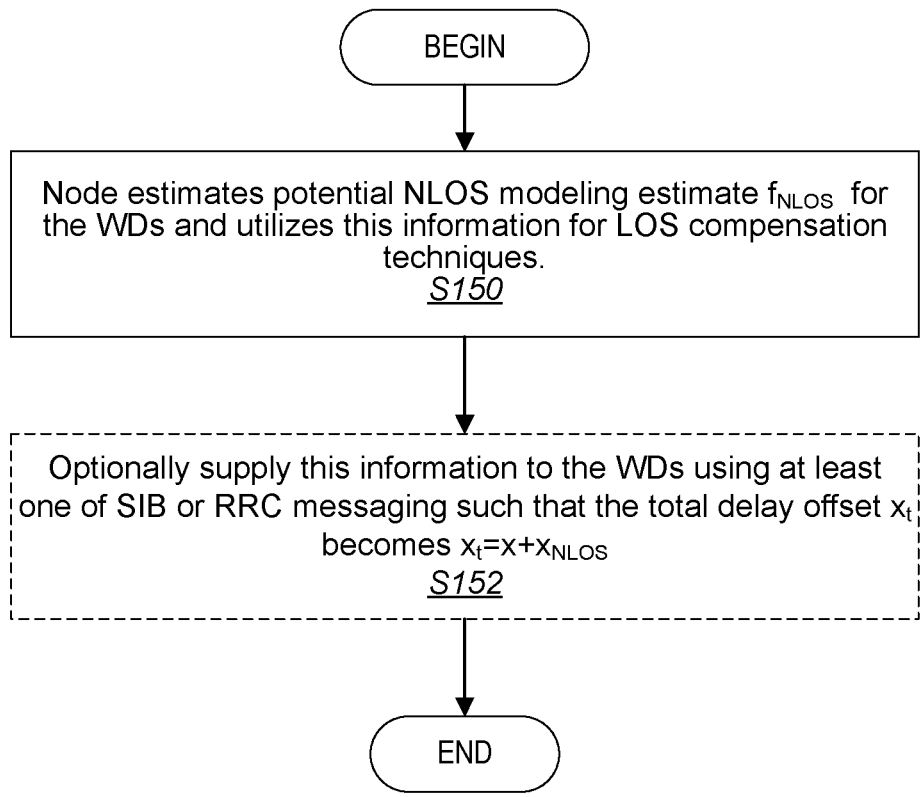
FIG. 11 is a flowchart of an exemplary process in a network node according to some embodiments of the present disclosure in which the network node estimates potential NLOS modeling estimate fNLOS for the WDs.

FIG. 11 is a flowchart of an exemplary process in a network node 16. One or more Blocks and/or functions performed by network node 16 may be performed by one or more elements of network node 16 such as by offset unit 32 in processing circuitry 68, processor 70, communication interface 60, radio interface 62, etc.

In one or more embodiments, network node 16 such as via one or more of processing circuitry 68, processor 70, radio interface 62 and communication interface 60 is configured to estimate (Block S150) potential NLOS modeling estimate $f_{NLOS}$ for the WDs and utilize this information for LOS compensation techniques. The node can map the information in terms of delay offset, e.g., $f_{NLOS} \rightarrow x_{NLOS}$ or $x_{NLOS}/R$.

In one or more embodiments, network node 16 such as via one or more of processing circuitry 68, processor 70, radio interface 62 and communication interface 60 is configured to optionally supply (Block S152) this information to the WDs using SIB or RRC messaging such that, in some embodiments, the total delay offset $x_t$ may become $x_t = x + x_{NLOS}$.

Having generally described arrangements for determining a delay offset based on at least one of a common distance and a NLOS factor and supplying the delay offset information to WDs 22 using SIB or RRC messaging, details for these arrangements, functions and processes are provided as follows and described with respect to the following numbered embodiments, and which may be implemented by the network node 16, wireless device 22 and/or host computer 24. In particular, solutions to the problem of clock inaccuracy inherent to methods for relaying one or more clocks (e.g. external TSN clocks) via the 5G system to WDs 22 supporting IIoT end devices are provided herein. The inaccuracy of concern may be a result of the RF propagation delay that occurs when a network node transmits a clock over the radio interface within a message (e.g., broadcast SIB or RRC unicast based) in which the propagation delay may be compensated for to ensure the clock value received by the WD 22 is as close as possible to the value of that clock in the corresponding source node (e.g., a TSN network node).

Subsequent WD distribution of the clock to IIoT end devices is desired to enable TSN functionalities, e.g., Time-Aware Scheduling of IIoT device operations specific to the working domain (a specific factory area) associated with a given working clock.

5G is intended to support TSN in Ethernet-based industrial communication networks. Example use cases may include factory automation networking.

Embodiment 1: Clock Synchronization Using a Delay Offset Based on Distance R/2

In this embodiment, a LOS compensation method is provided wherein the delay offset is chosen to be at a distance equal to half of the radius (R/2), i.e., median of the distance between center of the cell (network node 16 location) and the cell edge intended to be applicable for that cell. With this approach the PD delay error for a WD 22 at R/2 distance from the cell antenna is zero and the maximum PD error at cell edge and center of the cell (cell antenna) reduces to ±5R/3 ns. By using the delay offset indicated by SIB or RRC unicast message, the WD 22 adjusts the value of its received clock to thereby realize an improved synchronicity with that clock as compared with known solutions.

The network node 16 can transmit, for example via radio interface 62, this offset information, i.e., value R/2 or relative value ½ (alongside radius/maximum LOS cell edge information or not if WD 22 knows the cell radius by other means) in a newly designed parameter in a SIB or RRC message. When WD 22 receives the message, such as through radio interface 82, it may synchronize its clock by adding a time offset value of 5R/3 ns. WD 22 may need to ensure it has not applied any sort of other RF propagation delay compensation techniques prior to clock synchronization operation, otherwise the incorporated offset value may not be accurate. The method to be used can be negotiated between the network node 16 and WD 22. Embodiment 1 involves WD 22 first obtaining downlink synchronization (sync) per step 1 below (i.e., using known methods) and then increasing the value of any given received clock per step 2 below:

1. WD 22 achieves DL SFN sync as per known, i.e., legacy, operation and adjusts UL SFN transmission according to TA received from the network node 16 per legacy methods.

2. WD 22 maintains one or more clocks corresponding to different TSN domains because it supports applications associated with one or more of these domains for which it transmits UL information according to the current clock value for each of these domains. It may be desirable to maximize WD 22 clock synchronicity with each of these domains. WD 22 can be communicated the value of R/2c s (or 5R/3 ns) for its current cell through, for example, radio interface 62 and radio interface 82, and use the communicated value to adjust (increase) the value of the clocks WD 22 received while in the current cell.

Embodiment 2: Clock Synchronization Using a Delay Offset Based on a Mean Distance In this embodiment, e.g., if at least a majority of the WDs 22 or an average WD distance, are located at a distance x where 0≤x≤R, then the network node 16 may choose a reference corresponding to distance x. With this WD 22 majority location-based approach, an averaging of WD 22 distances can be determined, thereby allowing for the PD error introduced when adjusting the received value for a given clock to be minimized. However, the maximum PD is 10×max(x,R−x)/3 ns where 10×max(x,R−x)/3≥5R3.

The network node 16 can transmit this offset information, i.e., value x or relative value x/R (if WDs 22 know the cell radius R by other arrangements) in a newly designed parameter in a SIB or RRC message. The rest of the procedure may be similar to e.g., Embodiment 1.

In order to proceed, the network node 16 may determine, such as via processing circuitry 68, the average distance x in the cell. The distance x can be represented as:

$$x = \frac{\sum_{i=1}^{N} dis(i)}{N},$$

where N is the number of WDs 22 in the cell, and dis(i) represents the distance of the i-th WD 22. To determine distance x, network node 16 can use one or more of following techniques:

The network node 16 may utilize the location information of the static nodes, e.g., various kinds of static sensors. This information can be analyzed based on a survey of the static nodes and fed to the network node 16, such as via radio interface 62 and/or communication interface 60.

The network node 16 may estimate, such as via processing circuitry 68, the distance of a WD 22 based on a lag in the transmission signals, e.g., positive or negative delays in the pilot signals, i.e., dis(i)=delay(i)×3×10$^8$.

The network node 16 may request the WD 22 to transmit global positioning system (GPS) location if it is GPS enabled.

The delay offset information and/or the common distance may be based on regular measurements and/or related path-loss estimates as e.g., a function of the RF distance.

In some embodiments, the average distance may provide a more useful view related to the distribution of the WDs 22, i.e., give an on the average better representative value of X and thereby propagation delay offset to be used. As an example, if most WDs 22 are at cell edge (R) X may be closer to R and hence X may better reflect delays for the majority of WDs 22 in the cell.

Embodiment 3: NLOS Factor

In practice, the transmission delays rarely can be LOS based due to various environmental and surrounding obstacles. In some embodiments, the network node 16 may estimate, such as via processing circuitry 68, potential NLOS modeling estimate $f_{NLOS}$ for the WDs 22 and utilize this information for LOS compensation techniques.

The network node 16 may map the information in terms of delay offset, e.g., $f_{NLOS} \rightarrow x_{NLOS}$ or $x_{NLOS}/R$ and may supply, such as via radio interface 62, this information to WD 22 using SIB or RRC messaging.

From Embodiments 1-3, the total delay offset $x_t$ becomes:

$$x_t = x + x_{NLOS}.$$

Embodiment 4: SNR Sensitive Offset

Yet another approach is, if no good information exists with regard to the WD 22 distribution within the cell, it can be assumed there is a uniform distribution of WDs 22 in the cell. The network node 16 may transmit, such as via radio interface 62, SIB information that indicates the distance, which may be a fraction of the cell radius, R, (e.g., 0.7×R) representing the even split between number of WDs 22.

This may give a larger error at WDs 22 close to the network node 16 but then those generally have better SNR and therefore have a better time stamp accuracy (i.e., a better ability to detect when a given reference point within the SFN structure is received and therefore have the ability to minimize inaccuracy due to synchronizing on downlink SFNs).

The WD 22 monitors SIB changes and applies new compensation when the network node 16 determines a better estimation of WD distribution is to be applied (e.g., new SIB information can indicate 0.6R).

In addition, some embodiments may include one or more of the following:

Embodiment A1. A network node configured to communicate with a wireless device (WD), the network node configured to, and/or comprising a radio interface and/or comprising processing circuitry configured to:

determine a delay offset based at least in part on at least one of a common distance and a non-line-of-sight (NLOS) factor; and optionally supply delay offset information to the WD using system information block (SIB) or radio resource control (RRC) messaging.

Embodiment A2. The network node of Embodiment A1, wherein the delay offset is determined based at least in part upon a distance equal to half of the distance between a center of a cell and a cell edge of the cell.

Embodiment A3. The network node of any one of Embodiments A1 and A2, wherein the network node is further configured to, and/or the radio interface and/or the processing circuitry is further configured to, if a majority of WDs are located at a distance x where 0≤x≤R, choose a reference corresponding to distance x.

Embodiment A4. The network node of any one of Embodiments A1-A3, wherein the network node is further configured to, and/or the radio interface and/or the processing circuitry is further configured to estimate potential NLOS modeling estimate fNLOS for the WD and utilize this information for LOS compensation techniques.

Embodiment A5. The network node of any one of Embodiments A1-A4, wherein the network node is further configured to, and/or the radio interface and/or the processing circuitry is further configured to, if insufficient information exists with regard to WD distribution within the cell, assume a uniform distribution of WDs in the cell and send SIB information that indicates the distance 0.7×R.

Embodiment B1. A method implemented in a network node, the method comprising determining a delay offset based at least in part on at least one of a common distance and a non-line-of-sight (NLOS) factor and optionally supplying delay offset information to a wireless device (WD) using system information block (SIB) or radio resource control (RRC) messaging.

Embodiment B2. The method of Embodiment B1, wherein the delay offset is determined based at least in part on a distance equal to half of a distance between a center of a cell and a cell edge of the cell.

Embodiment B3. The method of any one of Embodiments B1 and B2, further comprising, if a majority of WDs are located at a distance x where 0≤x≤R, choosing a reference corresponding to distance x.

Embodiment B4. The method of any one of Embodiments B1-B3, wherein the network node estimates potential NLOS modeling estimate fNLOS for the WDs and utilizes this information for line-of-sight (LOS) compensation techniques.

Embodiment B5. The method of any one of Embodiments B1-B4, wherein, if insufficient information exists with regard to WD distribution within a cell, a uniform distribution of WDs in the cell is assumed and the node can send SIB information that indicates the distance 0.7×R.

Embodiment C1. A wireless device (WD) having a received clock, the WD configured to communicate with a network node, the WD configured to, and/or comprising a radio interface and/or processing circuitry configured to:

receive delay offset information based at least in part on at least one of a common distance and a non-line-of-sight (NLOS) factor.

Embodiment C2. The WD of Embodiment C1, wherein the WD is further configured to, and/or the radio interface and/or the processing circuitry is further configured to receive the delay offset information using at least one of system information block (SIB) or radio resource control (RRC) messaging.

Embodiment C3. The WD of any one of Embodiments C1 and C2, wherein the WD is further configured to, and/or the radio interface and/or the processing circuitry is further configured to use the delay offset information to adjust the value of the received clock.

Embodiment C4. The WD of any one of Embodiments C1-C4 wherein the WD is further configured to, and/or the radio interface and/or the processing circuitry is further configured to determine a delay offset based at least in part on a distance equal to half of a distance between a center of a cell and a cell edge of the cell.

Embodiment C5. The WD of any one of Embodiments C1-05, wherein the WD is further configured to, and/or the radio interface and/or the processing circuitry is further configured to, when the WD receives the delay offset information, synchronize a clock by adding a time offset value of 5R/3 ns.

Embodiment D1. A method implemented in a wireless device (WD), the method comprising receiving delay offset information based at least in part on at least one of a common distance and a non-line-of-sight (NLOS) factor.

Embodiment D2. The method of Embodiment D1, wherein the delay offset information is received using at least one of system information block (SIB) or radio resource control RRC messaging.

Embodiment D3. The method of any one of Embodiments D1 and D2, comprising using a delay offset indicated by the delay offset information to adjust the value of a received clock.

Embodiment D4. The method of any one of Embodiments D1-D3, comprising determining a delay offset based at least in part on a distance equal to half a distance between a center of a cell and a cell edge of the cell.

Embodiment D5. The method of any one of Embodiments D1-D4, wherein when WDs receive the message, they synchronize a received clock by adding a time offset value of 5R/3 ns.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| 5G | 5th Generation |
| ACK | Acknowledgement |
| CG | Configured Grant |
| DCI | Downlink Control Information |
| DL | Downlink |
| DMRS | Demodulation Reference Signal |
| GF | Grant-Free |
| gNB | Next Generation NodeB |
| ID | Identity |
| LTE | Long-Term Evolution |
| LOS | Line-of-Sight |
| MCS | Modulation and Coding Scheme |
| NACK | No Acknowledgement |
| NR | New Radio |
| NLOS | Non-Line-of-Sight |
| PRACH | Physical Random-Access Channel |
| PUSCH | Physical Uplink Shared Channel |
| SNR | Signal-to-Noise Ratio |
| SPS | Semi-Persistent Scheduling |
| TTI | Transmission Time Interval |
| UE | User Equipment |
| UL | Uplink |
| URLLC | Ultra-Reliable and Low-Latency Communications |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node supporting a cell, the network node configured to communicate with a wireless device, WD, for performing clock synchronization, the method comprising:

determining delay offset information based at least in part on a common distance applied for multiple wireless devices in the cell, the delay offset information indicating a common temporal delay offset, the delay offset information being based at least in part on a distance that is a fraction of a radius of the cell, the fraction being selected based at least in part on at least one of a signal-to-noise ratio, SNR, and an estimated distribution of WDs within the cell; and transmitting the delay offset information to the WD in at least one of a system information block, SIB, and a radio resource control, RRC, message.

2. The method of claim 1, wherein determining the delay offset information based at least in part on the common distance applied for multiple wireless devices in the cell further comprises:
determining the delay offset information based further on a non-line-of-sight, NLOS, factor, the NLOS factor based at least in part on a NLOS modeling estimate for WDs in the cell supported by the network node.

3. The method of claim 1, wherein the common temporal delay offset compensates for a line-of-sight, LOS, propagation delay error.

4. The method of claim 1, further comprising:
receiving an uplink transmission, the uplink transmission being synchronized to a source clock using the common temporal delay offset that is based at least in part on the common distance applied for multiple wireless devices in the cell.

5. A method implemented in a wireless device, WD, for performing clock synchronization, the wireless device configured to communicate with a network node supporting a cell, the method comprising:
receiving delay offset information in at least one of a system information block, SIB, and a radio resource control, RRC, message, the delay offset information being based at least in part on a common distance applied for multiple wireless devices in the cell and the delay offset information indicating a common temporal delay offset, the delay offset information being based at least in part on a distance that is a fraction of a radius of the cell, the fraction being selected based at least in part on at least one of a signal-to-noise ratio, SNR, and an estimated distribution of WDs within the cell.

6. The method of claim 5, wherein the delay offset information is based further on a non-line-of-sight, NLOS, factor, the NLOS factor based at least in part on a NLOS modeling estimate for WDs in the cell supported by the network node.

7. The method of claim 5, further comprising:
transmitting an uplink transmission, the uplink transmission being synchronized to a source clock using the common temporal delay offset that is based at least in part on the common distance applied for multiple wireless devices in the cell.

8. The method of claim 5, further comprising using the common temporal delay offset to adjust a value of a received clock.

9. A network node supporting a cell, the network node configured to communicate with a wireless device, WD, for performing clock synchronization and the network node comprising processing circuitry, the processing circuitry configured to cause the network node to:
determine delay offset information based at least in part on a common distance applied for multiple wireless devices in the cell, the delay offset information indicating a common temporal delay offset, the delay offset information being based at least in part on a distance that is a fraction of a radius of the cell, the fraction being selected based at least in part on at least one of a signal-to-noise ratio, SNR, and an estimated distribution of WDs within the cell; and
transmit the delay offset information to the WD in at least one of a system information block, SIB, and a radio resource control, RRC, message.

10. The network node of claim 9, wherein the processing circuitry is configured to determine the delay offset information based at least in part on the common distance applied for multiple wireless devices in the cell by being configured to cause the network node to:
determine the delay offset information based further on a non-line-of-sight, NLOS, factor, the NLOS factor based at least in part on a NLOS modeling estimate for WDs in the cell supported by the network node.

11. The wireless device of claim 9, wherein the processing circuitry is further configured to cause the wireless device to:
transmit an uplink transmission, the uplink transmission being synchronized to the source clock using the common temporal delay offset that is based at least in part on the common distance applied for multiple wireless devices in the cell.

12. A wireless device, WD, configured to perform clock synchronization and to communicate with a network node supporting a cell, the wireless device comprising processing circuitry, the processing circuitry configured to cause the wireless device to:
receive delay offset information in at least one of a system information block, SIB, and a radio resource control, RRC, message, the delay offset information being based at least in part on a common distance applied for multiple wireless devices in the cell and the delay offset information indicating a common temporal delay offset, the delay offset information being based at least in part on a distance that is a fraction of a radius of the cell, the fraction being selected based at least in part on at least one of a signal-to-noise ratio, SNR, and an estimated distribution of WDs within the cell.

13. The wireless device of claim 12, wherein the delay offset information is based further on a non-line-of-sight, NLOS, factor, the NLOS factor based at least in part on a NLOS modeling estimate for WDs in the cell supported by the network node.

14. The method of claim 12, wherein the WD is further configured to use the common temporal delay offset to adjust a value of a received clock.

* * * * *